United States Patent
Homann et al.

(10) Patent No.: US 8,246,121 B2
(45) Date of Patent: Aug. 21, 2012

(54) SOLENOID-VALVE UNIT FOR AN ELECTROPNEUMATIC CONTROLLER

(75) Inventors: Peter Homann, Neustadt (DE);
Bernd-Joachim Kiel, Wunstorf (DE);
Juan Rovira-Rifaterra, Garbsen (DE);
Hartmut Schappler, Hannnover (DE);
Andreas Teichmann, Isernhagen (DE);
Ingo Torhoff, Barsinghausen (DE)

(73) Assignee: WABCO GmbH, Hannover (DE)

( * ) Notice: Subject to any disclaimer, the term of this patent is extended or adjusted under 35 U.S.C. 154(b) by 869 days.

(21) Appl. No.: 12/290,995

(22) Filed: Nov. 4, 2008

(65) Prior Publication Data

US 2009/0114865 A1    May 7, 2009

(30) Foreign Application Priority Data

Nov. 6, 2007   (DE) .......................... 10 2007 052 697

(51) Int. Cl.
*B60T 8/36*   (2006.01)
(52) U.S. Cl. ............... 303/119.1; 303/DIG. 10
(58) Field of Classification Search ............... 303/119.2, 303/119.3, DIG. 10, 116.1, 116.4, 20
See application file for complete search history.

(56) References Cited

U.S. PATENT DOCUMENTS

| | | | |
|---|---|---|---|
| 6,206,482 B1 * | 3/2001 | Campau et al. | 303/20 |
| 6,234,199 B1 * | 5/2001 | Nohira | 303/119.3 |
| 6,439,673 B2 * | 8/2002 | Anderson | 303/119.3 |
| 6,453,936 B1 | 9/2002 | Frank et al. | |
| 7,578,564 B2 * | 8/2009 | Sakai | 303/119.3 |
| 2007/0236084 A1 | 10/2007 | Frank et al. | |

FOREIGN PATENT DOCUMENTS

| | | |
|---|---|---|
| DE | 100 09 116 A1 | 8/2001 |
| DE | 10 2004 035 763 A1 | 3/2008 |

* cited by examiner

*Primary Examiner* — Melanie Torres Williams
(74) *Attorney, Agent, or Firm* — Kramer Levin Naftalis & Frankel LLP

(57) ABSTRACT

A solenoid-valve unit for an electropneumatic controller, especially a pilot-control unit of an electropneumatic pressure modulator of a vehicle, includes a solenoid-valve unit having a valve-housing bottom with compressed-air bores, and solenoid valves having solenoids and displaceable magnet armatures. The solenoids are disposed outside of the valve-housing bottom. At least one pressure sensor for measuring pneumatic pressure in a compressed-air bore of the valve-housing bottom is placed in or on the valve-housing bottom. Electric leads to the solenoids and to the pressure sensor are routed to a common electrical interface.

41 Claims, 5 Drawing Sheets

SOLENOID-VALVE UNIT FOR AN ELECTROPNEUMATIC CONTROLLER

BACKGROUND OF THE INVENTION

The present invention relates to a new solenoid-valve unit for an electropneumatic controller. The present invention has particular application in pressure modulators used in vehicles, such as, for example, commercial vehicles.

DE 100 09 116 A1 describes a pilot-control unit for a brake-pressure modulator in a trailer vehicle equipped with an electronic brake system. The solenoid valves are constructed as cartridge solenoid valves, the valve cartridges of which are disposed in solenoid-containing housings. During manufacture, the solenoid is first inserted into the housing, after which the valve cartridge is inserted in mounting direction into the housing and attached to the housing. The pilot-control unit has both a pneumatic and an electrical interface.

DE 10 2004 035 763 A1 describes a valve-control device that can be provided as a valve-control unit for brake ducts of an electronically controlled pneumatic vehicle brake system. Three valve units are included, each designed as a valve-modulator device for one brake-pressure regulating circuit; in this case, an air-admission valve having a primary armature and an air-venting valve having a secondary armature are provided, the two magnet armatures having a common armature-guide arrangement and a common solenoid system and switching at different current intensities. This construction enables air to be admitted to the downstream wheel module, to hold the input pressure and to be vented by means of a common solenoid system.

Pilot-control units or valve-control units of the general type described in DE 100 09 116 A1 and DE 10 2004 035 763 A1, respectively, however, are generally characterized by complex constructions having large overall dimensions. In particular, the manufacture of a main housing and further components as well as the pneumatic routing of air through diverse air ducts, seals and possibly hoses between the various components engenders complexity. Even the mounting of solenoids and pressure sensors as well as the contacts with the electronics via separate interfaces contribute to complexity. Also, in such constructions, a defect in the sensors, valves or electronics, generally necessitates the replacement of the entire valve-control unit.

SUMMARY OF THE INVENTION

Generally speaking, in accordance with the present invention, a new solenoid-valve unit for an electropneumatic controller is provided which is inexpensive to manufacture, can be used in diverse ways and has small overall dimensions.

The solenoid-valve unit in accordance with embodiments of the present invention comprises (i) a valve-housing bottom having compressed-air bores, (ii) solenoid valves including solenoids and displaceable magnet armatures, (iii) at least one pressure sensor for measuring pneumatic pressure disposed in or on the valve-housing bottom, and (iv) electric leads to both the solenoids and the pressure sensor(s). The solenoids are disposed outside the valve-housing bottom and the electric leads of the solenoids and of the pressure sensor(s) are routed to a common electrical interface.

The inventive solenoid-valve unit is especially suited for use in a pilot-control unit for a vehicle pressure modulator. By means of its solenoid valves, such a pilot-control unit activates an air-flow-boosting relay valve, which in turn can activate one or more ducts. For use in an electropneumatic brake system, such as, for example, an electronically regulated brake system (EBS) for trailer vehicles, wheel-brake modules having brake cylinders for the wheel brakes are activated by the relay valve.

Accordingly, it is an object of the present invention to provide a new solenoid-valve unit for an electropneumatic controller that is inexpensive to manufacture, can be used in diverse ways and has small overall dimensions.

Still other objects and advantages of the present invention will in part be obvious and will in part be apparent from the specification.

The present invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1A:
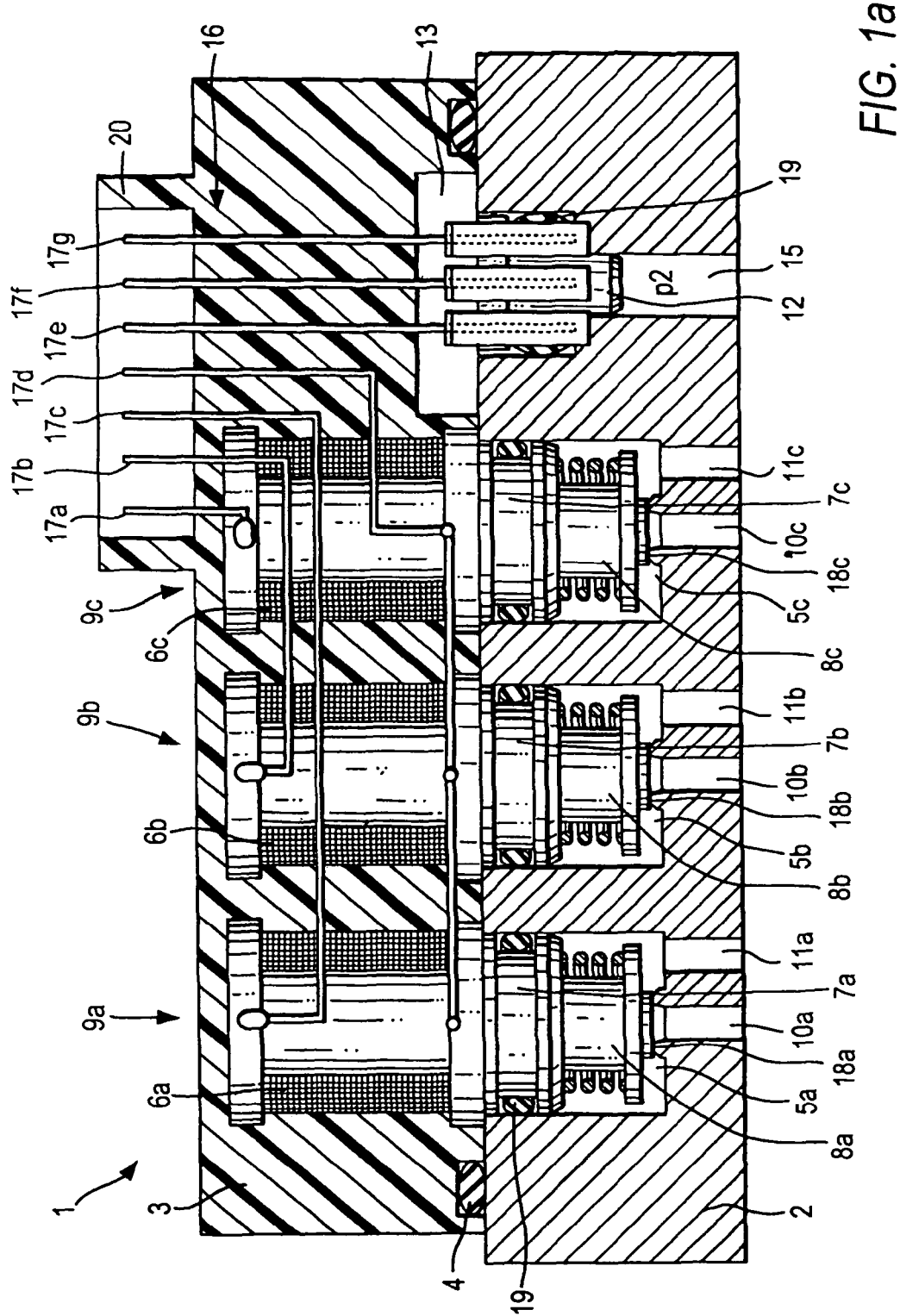
FIGS. 1a, b are sectional views through a solenoid-valve unit according to a first embodiment of the present invention for connection to a plug connector of a cable harness.

The present invention is based on the idea of integrating solenoid valves and a pressure sensor in a common structural unit. For this purpose, there is provided a common valve-housing bottom, which is preferably made of metal with compressed-air bores and into which the solenoid valves and the pressure sensor are inserted completely or partly from the upper side. In this way, the magnet armatures in particular can be inserted together with a guide tube or a cartridge into a correspondingly large bore of the valve-housing bottom. Thus, compressed-air bores in the valve-housing bottom are directly connected to the solenoid valves and the pressure sensor, the pressure sensor preferably being in communication via a compressed-air bore with a connected further relay valve or even one of the solenoid valves.

According to the present invention, a plurality of pressure sensors for measurement of a plurality of pressures can also be provided. In the case of use as a pilot-control unit for a pressure modulator, an inlet valve, an outlet valve and a redundancy valve can be provided to ensure pneumatic backup capability. With a redundancy valve, it is possible to switch automatically to pneumatically controlled pressure regulation in the event of detection of a malfunction in the electrical activation of the electromagnetic valves, especially in the case of failure of the electric voltage supply.

The inlet valve, outlet valve and redundancy valve are advantageously disposed next to one another in a row, for which purpose three corresponding bores are formed from the upper side in the valve-housing bottom and are connected to further compressed-air bores in the valve-housing bottom. In this case, the pressure sensor can be provided in the same row as the solenoid valves or else offset relative to their center; and the pressure sensor preferably measures the output pressure of the connected air-flow-boosting relay valve.

As an alternative to such a pilot-control unit, it is also possible according to the present invention to provide a solenoid-valve unit having, for example, two solenoid valves.

According to the present invention, common electrical contacting to a common electrical interface is provided not only for the solenoids of the solenoid valves but also for the terminals of the pressure sensor.

In a first embodiment, for this purpose a common lead frame or stamped frame (conductor frame) can be provided, which contacts the solenoids and the pressure sensor with its individual leads (lines) and is routed to the electrical interface. In this case, the lead frame is injection-molded in a control block, and preferably the solenoids are also injection-molded in the control block. The inventive solenoid-valve unit according to this embodiment is therefore formed substantially from the valve-housing bottom and the control block mounted sealingly on top. Preferably, the pressure sensor is not also injection-molded during manufacture of the control block, since it would then be exposed to high pressure and high temperature; according to the invention, the pressure sensor is advantageously fastened in or on the injection-molded control block only at a later time; it can be fastened in particular to the underside of the control block, for example in an appropriate cavity of the control block. For this purpose, for example, the pressure sensor can be plugged in, bolted or merely attached via its electrical contacting. The seal between the control block and the valve-housing bottom can be formed by a circumferential seal ring. The electrical contacting can be established, for example, by welding, plugging-in or soldering.

In this way, a compact solenoid-valve unit is formed, which in a confined installation space has complete electrical contacting with the electrical interface as well as pneumatic compressed-air bores in the valve-housing bottom for connection of a pneumatic interface. As a first option for the electrical interface in this case, there can be provided a plug connector formed in the control block, so that it can be used directly for coupling with a plug connector of a cable harness. Alternatively, the leads or supply lines can also project from the control block, so that they can be used directly as electric plug contacts or soldering pins for receiving a printed-circuit board or other circuit support, especially a printed-circuit board having an electronic control unit. A mechatronic unit in the form of a compact structural unit is obtained by the solenoid-valve unit together with the top-mounted circuit support.

According to a second embodiment, representing an alternative to the design of an injection-molded control block with lead frame, the solenoid valves can also be connected to a common yoke lamination, which preferably is coupled electrically or galvanically with the metal valve-housing bottom. The yoke lamination therefore extends over the solenoid valves, which are preferably disposed in a row. In this case, the sensor is pressed together with the yoke lamination into the valve-housing bottom, and additional fastening in the form of metal bolts can be provided.

The pressure sensor is preferably contacted directly on the circuit support, such as, for example, a printed-circuit board, a flex film or a flex ribbon or conductor ribbon. If a printed-circuit board is used, the pressure sensor can also be directly supported mechanically by it. In such an embodiment, the yoke lamination can be used as the ground terminal and therefore for drainage of electromagnetic charge (EMC) interferences, or as an EMC ground. Thus, an EMC shielding and grounding function is possible by means of the yoke lamination, even in the case of attachment to a plastic component, for example, or of a defect in the ground lead. In particular, the yoke lamination in this case can be provided next to the circuit support. Thus, the length of the leads to the solenoids can be kept short in all embodiments.

According to the present invention, still further electric units can be provided in all embodiments in addition to the pressure sensor, especially sensors such as displacement sensors or humidity sensors and/or actuators and/or miniature electronics or small electronic units, such as timer electronics, peak-and-hold controllers. Like the pressure sensor, these further electric units can be attached to the common electrical interface; in the embodiment having a lead frame, they can be appropriately received on the underside of the injection-molded control block.

It will be appreciated that, in the event of a defect of the sensors, valves or electronics, the present invention enables replacement of the component in question separately without exchanging the entire valve-control unit. Also, since the entire solenoid-valve unit together with the pressure sensor and the solenoid valves can be mounted by the supplier, assembly costs are saved. Compared with conventional constructions, there is no need for pneumatic connections such as tubes to a circuit support, as are often provided if the pressure sensor is seated on the circuit support, such as a printed-circuit board.

Referring now to the drawing figures where like reference numerals are used for corresponding parts, FIG. 1 depicts a solenoid-valve unit 1 having a valve-housing bottom 2 (lower part of the valve), formed from, for example, metal, as well as a top-mounted control block 3 of injection-molded plastic. Between control block 1 and valve-housing bottom 2 there is provided at least one seal 4.

Bores 5*a, b, c* are formed from the upper side as blind bores in valve-housing bottom 2. Three solenoids 6*a, b, c*, are received in control block 3 on whose underside respective valve-guide tubes 7*a*, 7*b*, 7*c* project downwardly into bores 5*a, b, c* and are sealed therein by means of respective seals 19. Solenoids 6*a, b, c* together with valve-guide tubes 7*a, b, c* receive respective magnet armatures 8*a, b, c*, which are seated under spring preload on valve seats 9*a, b, c* and, upon energization of solenoids 6*a, b, c*, are pulled upwardly into these solenoids. In this way, three solenoid valves 9*a, b, c*, are formed which are provided with respective solenoids 6*a, b, c*, valve-guide tubes 7*a, b, c* and displaceable magnet armatures 8*a, b, c*.

Solenoid valves 9*a, b, c* are used to control compressed-air bores 10*a*, 11*a*; 10*b*, 11*b*; 10*c*, 11*c* formed in valve-housing bottom 2. In this way, an inlet valve 9*a*, an outlet valve 9*b* and a redundancy valve 9*c* can be provided to switch to purely pneumatic backup capability, for example, in the event of controller failure, thus permitting completely pneumatic pressure modulation. Solenoid-valve unit 1 is used together with an electronic control unit (ECU) as a pilot-control unit, to which a relay valve is connected. As a result, a pressure modulator for brake-pressure modulation in a pneumatically braked vehicle is realized.

Solenoid valves 9*a, b, c* can be either 2/2 or 3/2-way valves, depending on the selected valve function and the construction of the bores in valve-housing bottom 2.

A pressure sensor 12 is received in a cavity 13 on the underside of control block 3. Pressure sensor 12 is inserted into a broad bore 14 in the upper side of valve-housing bottom 2, where it is also sealed appropriately by a seal 19, and it projects into a bore 15 of smaller cross section. Bore 15 is contiguous in valve-housing bottom 2 with bore 14 and, for example, is in communication with one of bores 10a, b, c, 11a, b, c or, if necessary, with a further bore branched off from solenoid valves 9a, b, c. This enables pressure measurement, preferably an output pressure or brake pressure of an air-flow-boosting relay valve connected to the pilot-control unit. If pressure sensor 12 is designed as a differential pressure sensor, it can be in communication with a vent duct of solenoid valves 9a, b or c or of the connected relay valve. In this way, dynamic pressures at the vent can be kept away from pressure sensor 12 by suitable throttling.

Electrical contacting is provided via a lead frame 16 (stamped frame, conduction grid), which is injection-molded in control block 3. In the illustrated embodiment, lead frame 16 has seven leads or lines 17a to 17g, each solenoid being connected in its lower region to a common ground line 17d and in its upper region to lines 17a, b, c. Furthermore, three lines 17e, f, g are routed upwardly from pressure sensor 12. All lines 17a to g are routed to a plug connector 20, which is formed on the upper side of control block 3 and can be used for coupling with a plug connector of a cable harness of a vehicle.

Figure 1B:
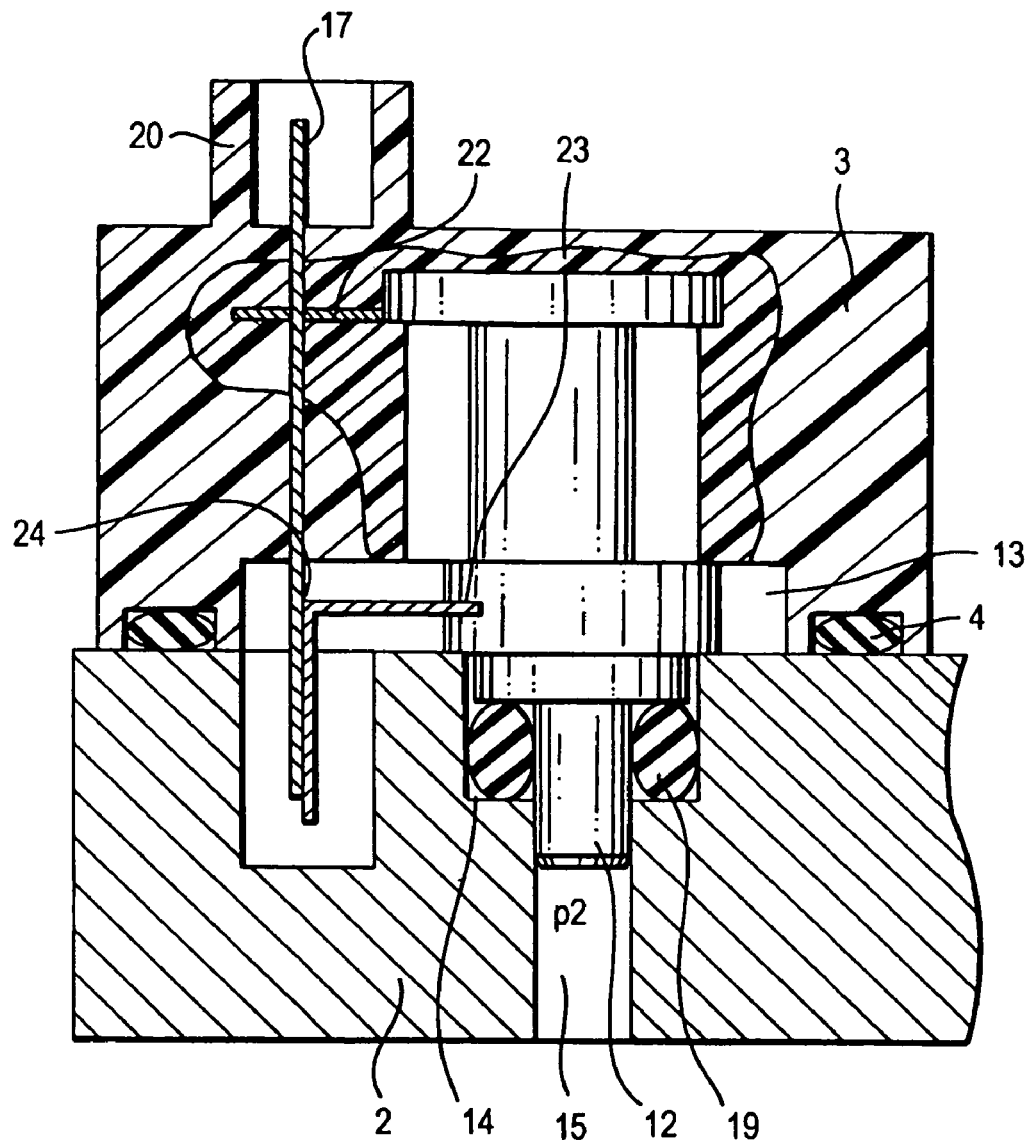

According to the lateral section of FIG. 1b, the contacting of the terminal pins or terminal legs 22, 23 of solenoids 6a, b, c and of pressure sensor 12 to lead frame 16 can be established by welded attachments and/or soldered attachments 24. For the manufacture of solenoid-valve unit 1 of FIG. 1, solenoids 6a, b, c can therefore be contacted with lead frame 16 or its lines 17a to g at first and then control block 3 can be injection-molded around lead frame 16 and also around the received solenoids 6a, b, c. Advantageously, it is only at a later time that pressure sensor 12 is inserted in cavity 13 on the underside of control block 3 and contacted with lead frame 16. The resulting arrangement is then inserted into valve-housing bottom 2 and secured with, for example, bolts.

As an alternative to the illustrated embodiment 1, respective valve cartridges or inserts for forming the valve seat can also be received in bores 5a, b, c.

Figure 2:
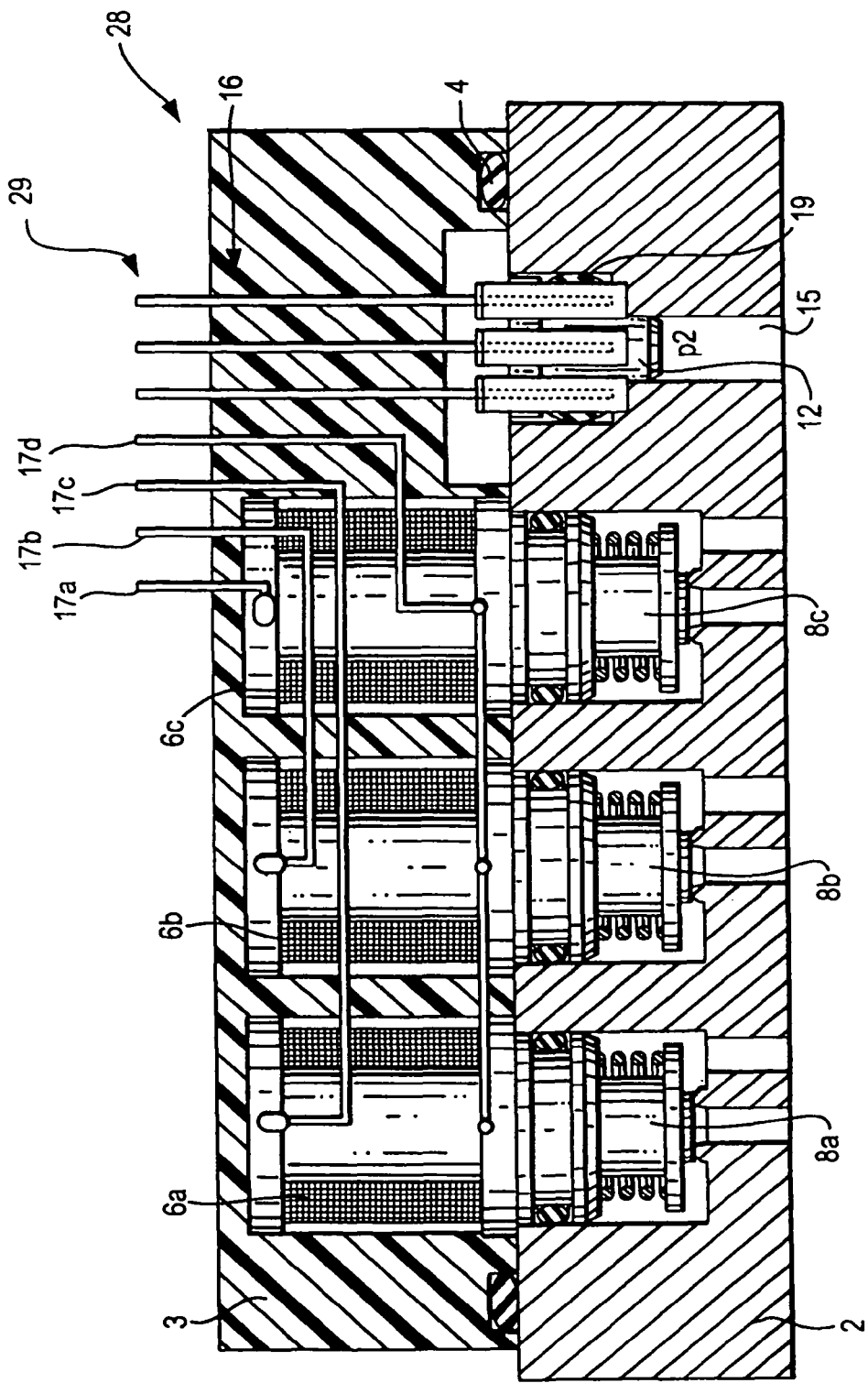
FIG. 2 shows a further inventive solenoid-valve unit in section as a mechatronic unit for connection to a control printed-circuit board.

FIG. 2 shows a further embodiment of the present invention, which, in its essential elements, corresponds to the embodiment of FIG. 1a, b. In this case, however, no plug connector 20 is formed on the upper side of control block 3. Instead, lines 17a to g project upwardly out of control block 3 as soldering pins or plug contacts in order to receive a circuit support, preferably, a printed-circuit board having an ECU. Together with the top-mounted circuit board, solenoid-valve unit 28 of FIG. 2 can therefore be used directly as a separate mechatronic unit.

Figure 3:
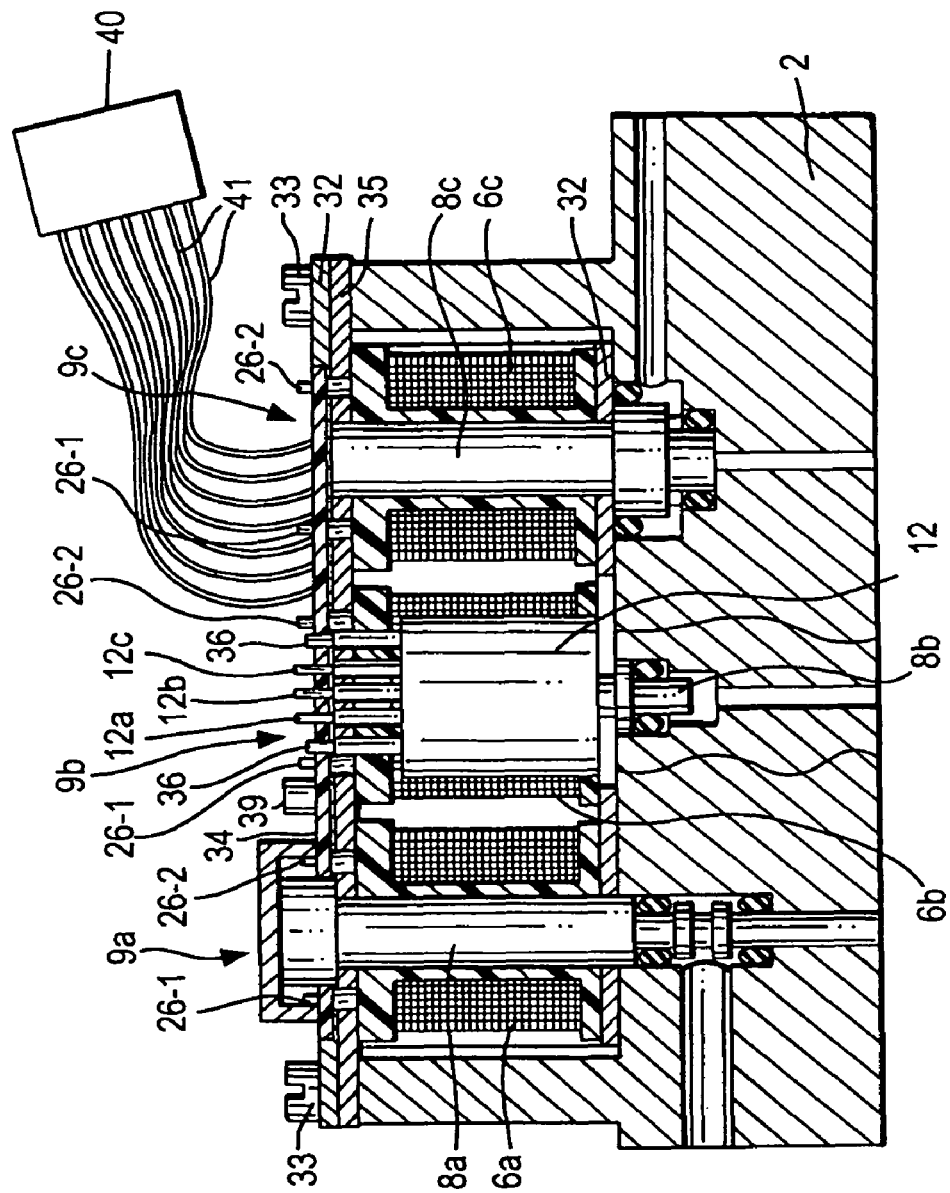
FIG. 3 is a sectional view showing a solenoid-valve unit according to another embodiment of the present invention with direct connection of the solenoid valves and of the pressure sensor to a printed-circuit board.
Figure 4:
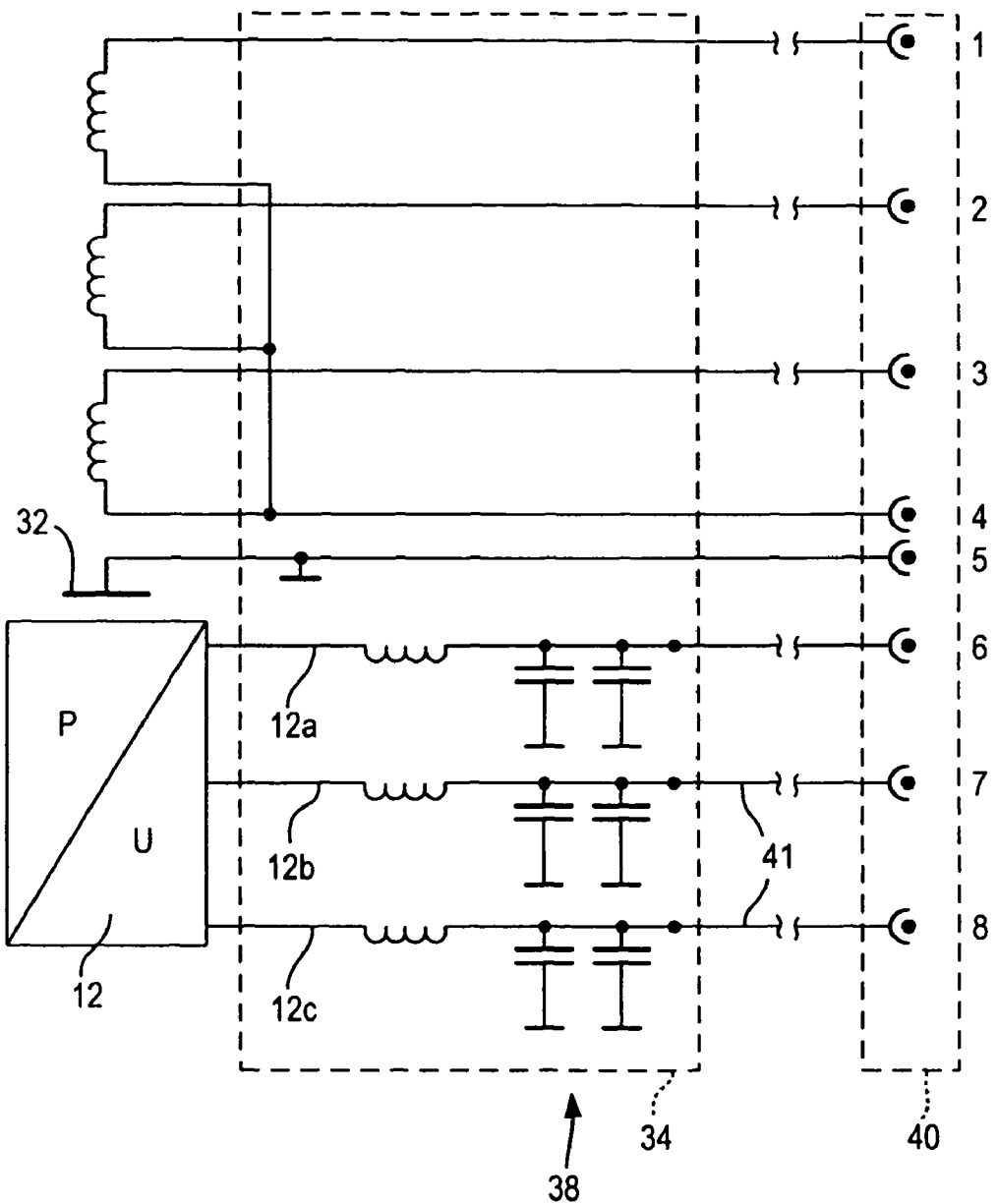
FIG. 4 is a circuit diagram of the electrical circuitry of the solenoid-valve unit according to FIG. 3.

In solenoid-valve unit 30 of FIGS. 3 and 4, solenoid valves 9a, b, c are disposed laterally next to one another together with solenoids 6a, b, c, which receive respective magnet armatures 8a, b, c, which are placed underneath in a valve-housing bottom 2 in a manner corresponding to FIGS. 1, 2. Also, in this embodiment a pressure sensor 12 is provided, although according to FIG. 3 it is not disposed next to the three solenoid valves 9a, b, c but, instead, is offset from them, specifically in front of them. In FIG. 3, middle solenoid valve 9b together with solenoid 6b are partly concealed by pressure sensor 12.

In the construction depicted in FIG. 3, a yoke lamination 35 is provided, which preferably has the form of a C-shaped bracket embracing the solenoids. In this embodiment, a retaining plate 32 (formed from, for example, metal or even plastic) is provided above yoke lamination 35. Plate 32 is used, in particular, to mechanically fix left solenoid valve 9a. In the illustrated embodiment, valve 9a is preloaded to open position when in de-energized condition, in which case its magnet armature 8a can project upwardly as shown.

Yoke lamination 35 rests on the upper side of solenoids 9a, b, c, and, together with retaining plate 32, is fastened to valve-housing bottom 2 by, for example, lateral bolts 33. For this purpose, valve-housing bottom 2 can have raised sides in order to receive bolts 33.

In this embodiment, the contacting of solenoids 6a, b, c as well as of pressure sensor 12 is established directly on a circuit support, preferably, a printed-circuit board 34. In this case, terminal pins 12a, b, c of pressure sensor 12 can be plugged directly into printed-circuit board 34. Advantageously, pressure sensor 12 is also fastened mechanically on its upper side to printed-circuit board 34 by means of, for example, lateral retaining pins 36. Correspondingly, solenoids 6a, b, c also have contact with printed-circuit board 34 via respective contacts 26-1 and 26-2. Contacts 26-1 and 26-2 can be plug contacts.

Printed-circuit board 34 is desirably positioned next to yoke lamination 32, preferably, in front of it as shown in FIG. 3. An ECU 39 can be mounted directly on top of printed-circuit board 34.

Since pressure sensor 12 in FIG. 3 occupies a central symmetric position in front of the three solenoid valves 9a, b, c, it is possible, for multi-circuit applications, to position installation locations in mirror-image relationship in the modulators. In this way, the coupling of magnetic fields into pressure sensor 12 is minimal.

Here, pressure sensor 12 is connected to printed-circuit board 34 at terminals or terminal pins 12a, b, c. Preferably, the pressure sensor has sufficient tolerance freedom in the direction perpendicular to the illustrated section plane (out of the paper), and in FIG. 3 is received with friction fit on the left and right. Thus, pressure sensor 12 has play or tolerance freedom perpendicular to the axial direction of insertion (downward in FIG. 3) and perpendicular to the line connecting its terminal pins 12a, b, c. In the event of mechanical maladjustment, therefore, terminal pins 12a, b, c, or their electrical contacts, are not stressed, since the pressure sensor can relax perpendicular to the contact plane.

Instead of printed-circuit board 34, it is also possible, for example, to use a flexible circuit support, such as a flex film (flexible film) or a conductor ribbon, such as a flat ribbon cable, or even individual lines, preferably in combination with a mechanical holder. The mating connection on the ECU of the pilot-control unit can be respectively soldered or plugged in.

The embodiment of the present invention depicted in FIG. 3, therefore, represents a modular system for use in different applications, in which selected suitable valve-cartridge inserts can be placed in solenoids 6a, b, c and also different pressure sensors 12 and, if necessary, even further sensors or actuators can be used.

In accordance with the present invention, the tolerance accuracy of the joint that the ECU together with printed-circuit board 34 as well as pressure sensor 12 on the pilot-control module makes with valve-housing bottom 2 is not critical. There is no need to allow for tolerance equalization. Thus, even simple pneumatic valve constructions are possible for the relay valve connected downstream.

Referring now to FIG. 4, the terminals or terminal pins 12a, b, c of pressure sensor 12 are connected to printed-circuit board 34 via resistor-capacitor (RC) elements 38 as low-pass devices. The length of the lines between solenoids 6a, b, c as well as pressure sensor 12 and the ECU can be designed to be 120 mm, for example, in order to ensure maximum mobility in the installation space. Yoke lamination 32 is shown equipped with a separate EMC-GND grounding terminal, so that, in the case of mounting on a plastic part, for example, yoke lamination 32 can correspondingly represent the ground, even without a connection to the vehicle-body frame. Further, EMC shielding elements can be provided on printed-circuit board 34; also, a plug connector 40 for connection to a cable harness can be provided on printed-circuit board 34 via lines 41, for example.

Accordingly the present invention provides a new solenoid-valve unit for an electropneumatic controller that is inexpensive to manufacture, can be used in diverse ways and has small overall dimensions.

It will thus be seen that the objects set forth above, among those made apparent from the preceding description, are efficiently attained and, since certain changes may be made in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A solenoid-valve unit for an electropneumatic controller, comprising:
    a common valve-housing bottom having compressed-air bores;
    solenoid valves including solenoids and displaceable magnet armatures;
    at least one pressure sensor for measuring at least one pneumatic pressure, the at least one pressure sensor being disposed in the common valve-housing bottom and in communication with at least one of the compressed-air bores;
    first electrical leads for the solenoids;
    second electrical leads for the at least one pressure sensor, the solenoids being disposed outside of the common valve-housing bottom and the first and second electrical leads being routed to a common electrical interface;
    a control block fastened sealingly on the valve-housing bottom, the control block configured to receive the solenoids and the first and second-electrical leads between the electrical interface, the solenoids and the at least one pressure sensor; and
    a lead frame, at least a part of the lead frame including the first and second electrical leads, the control block being injection-molded around the lead frame and the solenoids.

2. The solenoid-valve unit according to claim 1, wherein the magnet armatures are inserted into the compressed-air bores formed from an upper side of the valve-housing bottom and the solenoids are mounted on top of the valve-housing bottom.

3. The solenoid-valve unit according to claim 2, further comprising, for each of the solenoid valves, a valve-guide tube for receiving respective ones of the magnet armatures, the valve-guide tube being inserted sealingly into respective ones of the compressed-air bores.

4. The solenoid-valve unit according to claim 1, wherein the solenoid valves comprise an inlet valve, an outlet valve, and a redundancy valve.

5. The solenoid-valve unit according to claim 1, wherein terminal pins of the solenoids and the at least one pressure sensor are at least one of welded and soldered to the lead frame.

6. The solenoid-valve unit according to claim 5, wherein the control block is a plastic control block.

7. The solenoid-valve unit according to claim 5, wherein the electrical interface is a plug connector for receiving a mating connector, the electrical interface being provided on an external side of the control block.

8. The solenoid-valve unit according to claim 7, wherein the mating connector is a vehicle cable harness plug connector.

9. The solenoid-valve unit according to claim 5, wherein the electrical interface includes at least one of projecting plug contacts and soldering pins, the at least one of plug contacts and soldering pins being configured to receive a circuit support, the electrical interface being provided on an external side of the control block.

10. The solenoid-valve unit according to claim 9, wherein the circuit support is a printed-circuit board.

11. The solenoid-valve unit according to claim 5, wherein the at least one pressure sensor and the solenoid valves are disposed substantially next to one another in a row.

12. The solenoid-valve unit according to claim 1, wherein the at least one pressure sensor includes terminals disposed in a line on the electrical interface, and the at least one pressure sensor is received with at least one of a tolerance and swiveling freedom in a direction that runs perpendicular to a line of connection and perpendicular to a direction of insertion of the at least one pressure sensor into the valve-housing bottom.

13. The solenoid-valve unit according to claim 1, wherein the at least one pressure sensor is connected by at least one of the compressed-air bores of the valve-housing bottom to an output region of a downstream relay valve.

14. A solenoid-valve unit for an electropneumatic controller, comprising:
    a valve-housing bottom having compressed-air bores;
    solenoid valves including solenoids and displaceable magnet armatures;
    at least one pressure sensor for measuring at least one pneumatic pressure disposed in the common valve-housing;
    first electrical leads for the solenoids; and
    second electrical leads for the at least one pressure sensor, the solenoids being disposed outside of the common valve-housing bottom and the first and second electrical leads being routed to a common electrical interface, wherein the electrical interface is a circuit support, and wherein the solenoid valves are connected to a common yoke lamination and the first and second electrical leads are connected to the circuit support.

15. The solenoid-valve unit according to claim 14, wherein the circuit support is at least one of a printed-circuit board, a flexible conductor film and a flat ribbon cable.

16. The solenoid-valve unit according to claim 14, further comprising an electronic control unit on the circuit support for activating the solenoids and for reading the at least one pressure sensor.

17. The solenoid-valve unit according to claim 14, wherein the yoke lamination and the electrical interface are fastened to a common support fastened onto the valve-housing bottom.

18. The solenoid-valve unit according to claim 17, wherein the common support is formed from plastic.

19. The solenoid-valve unit according to claim 14, wherein the yoke lamination is in electrical contact with the valve-housing bottom.

20. The solenoid-valve unit according to claim 19, wherein the yoke lamination is fastened to the valve-housing bottom by fastening bolts.

21. The solenoid-valve unit according to claim 14, wherein the at least one pressure sensor includes terminals fastened to the circuit support.

22. The solenoid-valve unit according to claim 21, wherein the terminals include at least one of terminal legs and terminal pins formed as at least one of plug contacts and soldering pins.

23. The solenoid-valve unit according to claim 21, wherein the at least one pressure sensor includes at least one retaining pin fastened mechanically to the circuit support.

24. The solenoid-valve unit according to claim 14, wherein the circuit support and the yoke lamination are disposed next to one another.

25. The solenoid-valve unit according to claim 24, wherein the circuit support and the yoke lamination are disposed parallel to one another.

26. The solenoid-valve unit according to claim 14, wherein the solenoid valves are disposed in a row and the at least one pressure sensor is offset relative to the row.

27. The solenoid-valve unit according to claim 14, wherein the at least one pressure sensor is disposed offset relative to a center of the row.

28. The solenoid-valve unit according to claim 14, wherein the solenoids include valve-cartridge inserts.

29. The solenoid-valve unit according to claim 28, wherein the valve-cartridge inserts include at least one of 2/2-way and 3/2-way valve inserts.

30. The solenoid-valve unit according to claim 14, wherein the at least one pressure sensor is connected to the electrical interface by a filter device.

31. The solenoid-valve unit according to claim 28, wherein the filter device is a low pass filter.

32. The solenoid-valve unit according to claim 31, wherein the filter device includes a plurality of RC elements.

33. The solenoid-valve unit according to claim 14, wherein the electrical interface includes an EMC ground terminal on the yoke lamination.

34. A pressure modulator, comprising:
a solenoid-valve unit, the solenoid-valve unit including:
  a valve-housing bottom having compressed-air bores;
  solenoid valves including solenoids and displaceable magnet armatures;
  at least one differential pressure sensor connected by at least one of the compressed-air bores of the valve-housing bottom to an output region of a downstream relay valve;
  first electrical leads for the solenoids;
  second electrical leads for the at least one differential pressure sensor, the solenoids being disposed outside of the valve-housing bottom;
a plastic control block fastened sealingly on the valve-housing bottom, the plastic control block configured to receive the solenoids and the first and second-electrical leads between the electrical interface, the solenoids and the at least one pressure sensor; and
a lead frame, at least a part of the lead frame including the first and second electrical leads, the control block being injection-molded around the lead frame and the solenoids, the first and second electrical leads being routed to a common electrical interface, and the at least one differential pressure sensor in communication with atmospheric pressure via a vent duct of at least one of the relay valve and the solenoid valves.

35. The pressure modulator according to claim 34, further comprising a control unit for activating the solenoids and for reading the at least one differential pressure sensor.

36. The pressure modulator according to claim 35, wherein the control unit is activated by a central control module of a vehicle.

37. The pressure modulator according to claim 36, wherein the control unit is activated by the control module via a vehicle cable system.

38. A brake-pressure modulator of an electropneumatic vehicle braking system, the modulator comprising:
a solenoid-valve unit, the solenoid-valve unit including:
  a valve-housing bottom having compressed-air bores;
  solenoid valves including solenoids and displaceable magnet armatures;
  at least one differential pressure sensor connected by at least one of the compressed-air bores of the valve-housing bottom to an output region of a downstream relay valve;
  first electrical leads for the solenoids;
  second electrical leads for the at least one differential pressure sensor, the solenoids being disposed outside of the valve-housing bottom;
a plastic control block fastened sealingly on the valve-housing bottom, the plastic control block configured to receive the solenoids and the first and second-electrical leads between the electrical interface, the solenoids and the at least one pressure sensor; and
a lead frame, at least a part of the lead frame including the first and second electrical leads, the control block being injection-molded around the lead frame and the solenoids, the first and second electrical leads being routed to a common electrical interface, and the at least one differential pressure sensor in communication with atmospheric pressure via a vent duct of at least one of the relay valve and the solenoid valves.

39. The brake-pressure modulator according to claim 38, further comprising a control unit for activating the solenoids and for reading the at least one differential pressure sensor.

40. The brake-pressure modulator according to claim 39, wherein the control unit is activated by a central control module of a vehicle.

41. The brake-pressure modulator according to claim 40, wherein the control unit is activated by the control module via a vehicle cable system.

* * * * *